US004001621B2

United States Statutory Invention Registration [19]

[11] Reg. Number: H1621

Ray

[45] Published: Dec. 3, 1996

[54] OFFSET CORRUGATED PANEL WITH CURVED CORRUGATIONS FOR INCREASED STRENGTH

[75] Inventor: Hemen Ray, Perkasie, Pa.

[73] Assignee: The United States of America as represented by the Secretary of the Navy, Washington, D.C.

[21] Appl. No.: 384,820

[22] Filed: Jan. 31, 1995

[51] Int. Cl.[6] ..... B32B 1/00; B32B 3/00

[52] U.S. Cl. ..... 428/174; 428/182; 428/184; 428/185; 428/141

[58] Field of Search ..... 428/182, 184, 428/185, 141; 52/795

[56] References Cited

U.S. PATENT DOCUMENTS

| | | | |
|---|---|---|---|
| 3,574,103 | 4/1971 | Latkin | 161/43 |
| 4,472,473 | 9/1984 | Davis et al. | 428/184 |
| 4,689,261 | 8/1987 | Ahnström | 428/182 |
| 4,769,968 | 9/1988 | Davis et al. | 52/814 |
| 5,028,474 | 7/1991 | Czaplicki | 428/178 |
| 5,162,143 | 11/1992 | Porter et al. | 428/179 |
| 5,348,601 | 9/1994 | Ray | 156/155 |

*Primary Examiner*—Charles T. Jordan
*Assistant Examiner*—Meena Chelliah
*Attorney, Agent, or Firm*—Susan E. Verona

[57] ABSTRACT

A corrugated panel having a core between two faceplates where the core and faceplates are comprised of curable material and where the core is comprised of undulate strips that are disposed in parallel relation to each other. The strips define peaks and valleys connected by diagonally-extending segments that have non-planar cross-sections. The peaks and valleys in adjacent strips are 180 degrees out of phase with respect to each other. The faceplates and the strips are joined at the peaks and valleys.

A method of making a corrugated panel assembly comprising the steps of providing upper and lower faceplates and a core of strips, all made from curable material. Mandrels and inserts are used to form the strips into alternately-arranged peaks and valleys that are interconnected by diagonal segments where the diagonally-extending segments have non-planar cross-sections. The strips are 180 degrees out of phase with respect to each other. The mandrels are replaced by granular particles and the assembly is cured.

21 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OFFSET CORRUGATED PANEL WITH CURVED CORRUGATIONS FOR INCREASED STRENGTH

The invention described herein may be manufactured and used by or for the Government of the United States of America for governmental purposes without the payment of any royalties thereon or therefor.

FIELD OF THE INVENTION

The present invention relates to improvements in corrugated panels, sometimes referred to as "sandwich panels." More particularly, the invention relates to a self-venting corrugated panel having arcuately-shaped trusses or risers for providing improved strength, i.e., resistance to compressive and bending forces. The invention further relates to a method for producing such panels.

THE PRIOR ART

Light-weight sandwich panel construction employing honeycomb cores and the like have proven to be highly useful and beneficial for various aerospace applications, such as in the manufacture of space vehicle and satellite components. However, the application of such panels to the primary and secondary structures of ground-based airplanes and helicopters has resulted in significant maintenance problems. For example, during the past twenty years of service experience, very high frequency of repair has been reported due, for example to problems with moisture retention, corrosion, ineffective edge seals and unbonding of the faceplates from the intervening core structure. Moreover, during repair work, further unbonding of the faceplates from the core structure can occur due to high vapor pressure produced by the heating process used to cure the repair material. Thus, any comparable substitute to a honeycomb sandwich construction that eliminates or reduces the moisture retention and unbonding problem would be beneficial.

U.S. Pat. No. 5,348,601 issued to Hemen Ray on Sept. 20, 1994 discloses a low-density sandwich construction that is useful both in structural and nonstructural applications. It has an open construction that makes it self-venting. Thus, to the extent that moisture is formed in it the venting will cause it to evaporate.

It comprises a plurality of parallel strips of curable material that are placed between relatively thin high-strength faceplates to provide a construction having a low-density core. The faceplates may be made from the same curable material as the strips. The strips are of undulate shape at a fixed frequency to define peaks and valleys having planar tops and bottoms. The peaks and valleys are interconnected by diagonally-extending risers of planar configuration. Adjacent parallel strips are 180 degrees out of phase with each other.

In self-venting panels of the type described above, diagonally-extending risers (which serve as struts or trusses between the opposing faceplates) have a flat or planar configuration. Thus, they offer relatively little resistance to bending forces. This result is apparently desired in achieving the intended flexibility of such structures. On the other hand, such self-venting core structures are not especially well-adapted for use in applications requiring a degree of stiffness or rigidity.

SUMMARY OF THE INVENTION

In view of the foregoing discussion, an object of this invention is to provide a self-venting corrugated panel which is substantially stiffer than similarly constructed panels of the prior art.

Another object of this invention is to provide a method for manufacturing the corrugated panel of the invention.

The corrugated panel of the invention comprises a core structure including a plurality of spaced undulate, parallel strips between the panel's faceplates to define peaks and valleys connected by diagonally-extending segments. Preferably, the peaks and valleys of adjacent strips are 180 degrees out of phase with respect to each other. According to the invention, the diagonally-extending segments are characterized by an arcuate cross-section which tends to resist bending forces applied in a direction generally perpendicular to the strip.

The preferred method of manufacturing the invention involves the steps of: providing a plurality of elongated solid mandrels and upper and lower faceplates; wrapping flexible strips containing a curable material over and under the mandrels so that a planar surface of the strips contacts and is deformed by the shaped insert; placing the mandrel/strip assembly between the faceplates to form a corrugated panel assembly; removing the mandrels and curing the panel assembly to form the panel.

The invention and its various advantages will be better understood from the ensuing detailed description of preferred embodiments, reference being made to the accompanying drawings.

DETAILED DESCRIPTION OF THE PREFERRED EMBODIMENTS

Figure 1:
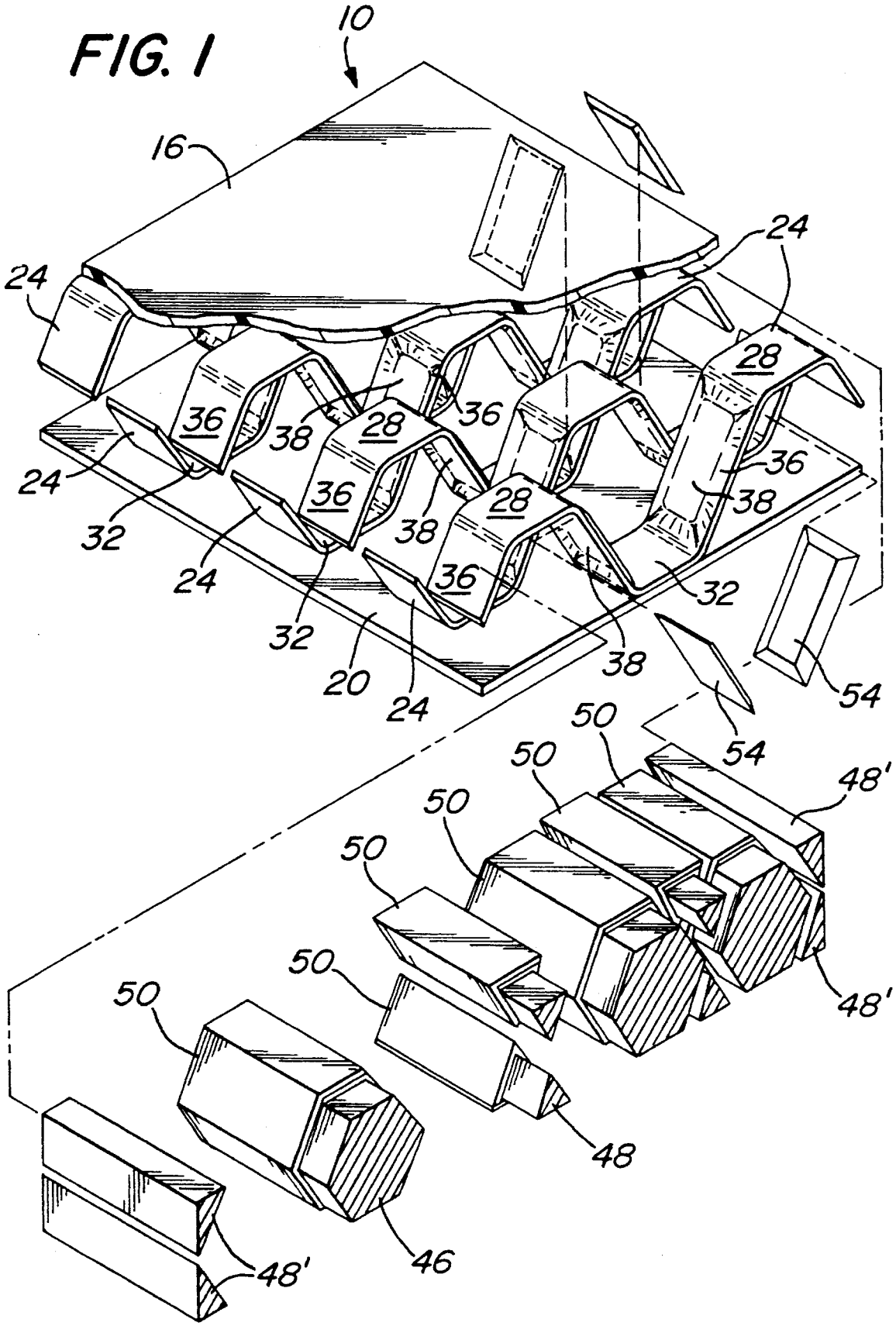
FIG. 1 is an exploded view of a preferred embodiment of the corrugated panel of the invention prior to being cured.

Referring to the drawings, FIG. 1 illustrates the structural details of a corrugated panel 10 according to a preferred embodiment of the invention. As shown, such a corrugated panel 10 comprises a pair of opposing faceplates 16 and 20 having a plurality of parallel, semi-rigid, undulate strips 24 therebetween. The strips 24 form peaks 28 and valleys 32 that are interconnected by diagonally-extending segments 36. The peaks 28 and valleys 32 have substantially planar tops and bottoms to which the faceplates 16 and 20 are readily bonded. Preferably, faceplates 16 and 20 and the undulate strips 24 are made of a conventional heat-curable composite material.

The peaks 28 and valleys 32 of adjacent strips 24 are 180 degrees out of phase so that the peaks of one strip correspond to the valleys of its adjacent strips along their length. Further, it is preferred that there be a slight space between adjacent strips 24.

As seen in FIG. 1 each of the diagonally-extending segments 36 of the strips 24 has an indented region 38 to provide the strip with an arcuate transverse cross-section in this region. This curvature across the diagonally-extending segments 36 of the strip 24 enhances the strip's beam strength, much like the curvature in a metal tape measure serves to prevent bending of the tape measure as longer lengths are meted out. This feature is particularly advantageous since it results in a substantially stiffer and stronger panel, one that is particularly resistive to compressive forces applied normal to the faceplates.

Figure 2:
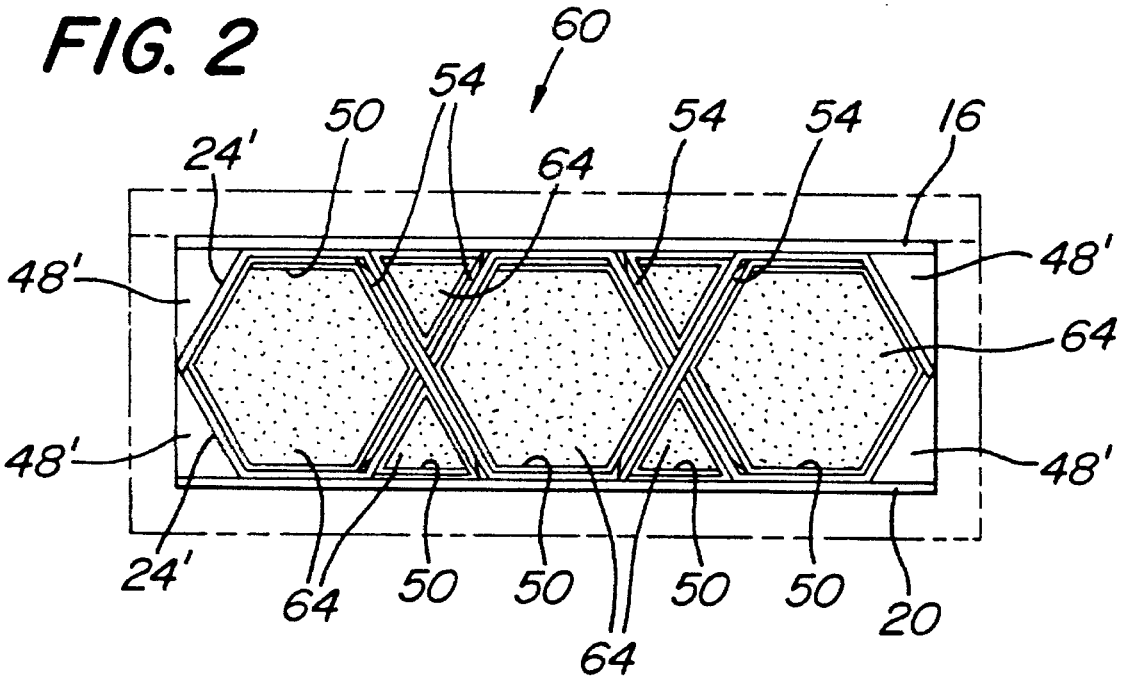
FIG. 2 illustrates an intermediate step in manufacturing the corrugated panel shown in FIG. 1.

A preferred method of manufacturing a corrugated panel of the type shown in FIG. 1 is illustrated in FIGS. 1 and 2. This method uses a plurality of solid and elongated mandrels, some being of hexagonal cross-section as shown at 46, and others being of triangular cross-section as shown at 48. Each of the mandrels is wrapped with a thin stretchable release film 50 made of plastic-type material. Examples of suitable release films are the A4000, WRIGHTLON 4500 (a halohydrocarbon release film), WRIGHTLON 4600, WRIGHTLEASE 5900 (a high temperature fluorocarbon film) and THERMALIMIDE (a polyamide film) films made and sold by Airtech International, Inc., Carson, California. The wrapped solid mandrels 46 and 48 are then arranged in a parallel and equally-spaced manner, as illustrated in FIG. 1, with each of the hexagonally-shaped mandrels 46 resting on one of its planar surfaces, and the triangularly-shaped mandrels 48 being disposed in the opposing triangular spaces defined by adjacent hexagonal mandrels.

Each of a plurality of solid shaped inserts 54 is placed between each adjacent pair of mandrels, each of the inserts 54 having a width somewhat less than the width of the strips 24 as shown in FIG. 1. Next, flexible strips or ribbons 24' of uncured composite material are wrapped over and under the hexagonal mandrels 46, each ribbon 24' being aligned with and contacting the shaped inserts 54. The pressure applied to the ribbons 24' by the mandrels 46 and 48 and shaped inserts 54 deforms the central region of each ribbon 24' between adjacent mandrels, thereby forming the desired curvature in the diagonally-extending segments 36. Thus, it is preferred that the shaped inserts 54 have a suitable arcuate cross-section such as the plano-convex cross-section shown with the convex surface of the insert contacting the center of the ribbon. Suitable material for ribbons 24 is MAGNAMITE (registered trademark) Graphite Prepreg Tape AS4/3501-6, made and sold by Hercules Incorporated of Wilmington, Del. Such a tape comprises an amine-cured epoxy resin reinforced with unidirectional graphite fibers.

Having wrapped the solid mandrels and inserts with the ribbons of uncured composite material, each of a pair of uncured composite faceplates 16 and 20, preferably comprising the same material as the ribbons 24', is placed on opposite sides of the mandrel assembly, the assembly's opposed upper and lower planar surfaces lying along the upper and lower faceplates 16 and 20. The resulting assembly is placed inside a suitably stiff mold cavity 60 with all of its walls, except for the front end wall, secured. Next, the solid mandrels 46 and 48 (except for the four triangular mandrels 48' at the four corners of the assembly) are carefully removed without disturbing the release film 50, which remains in place. The voids resulting from the removal of the mandrels 46 and 48 are filled and compacted with a suitable granular mixture 64, such as a mixture of glass beads and plastic-type powder such as polytetrafluoroethylene (PTFE), to provide an assembly having a plurality of granular mandrels. (See FIG. 2).

After all of the granular mandrels have been formed, the front of the cavity is covered with a soft, uncured silicone rubber-type material. The front of the cavity containing the assembly is then closed by the cavity front wall in a well-known manner. Before curing, the top of the cavity is preferably unfastened and loosely placed on the assembly.

Finally, the entire assembly is subjected to the curing conditions recommended by the manufacturer of the composite material.

During curing the uncured strips 24' will harden into the undulate semi-rigid strips 24 and they will be integrally bonded to faceplates 16 and 20 at their peaks and valleys 28 and 32.

Figure 3:
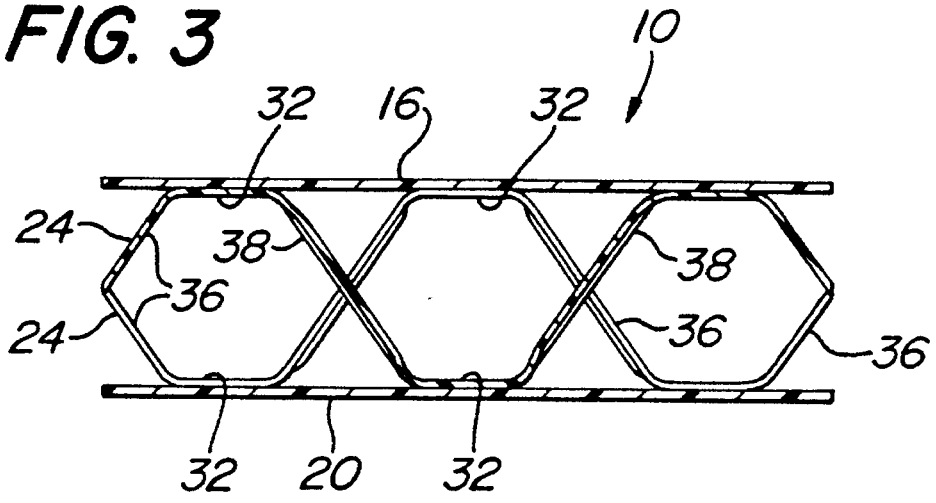
FIG. 3 is a cross-sectional view of the corrugated panel shown in FIG. 1.

Upon completion of the cure cycle, the cavity walls are removed and the granular mixture 64 is removed. The release film 50 and shaped inserts 54 are then removed leaving the corrugated panel shown in FIG. 3. The shaped inserts 54 and granular mixture 64 may be reused in subsequent panel-making processes.

The corrugated panel 10 can be made in any convenient cross-section. Thus, while it has been described in the context of a corrugated panel when the opposing faceplates 16 and 20 appear to be parallel, the panel can be of any convenient cross-section such as trapezoidal, arcuate or even arcuately trapezoidal provided the diagonally-extending segments are properly sized.

The invention has been described with reference to particular preferred embodiments. It will be apparent to skilled artisans that various modifications can be made without departing from the spirit of the invention, and such modifications are intended to fall within the scope of the appended claims.

What is claimed:

1. A corrugated panel, comprising:

means defining a pair of spaced planes;

a core including a plurality of spaced parallel strips of undulate shape disposed between said pair of spaced planes to define peaks and valleys connected by diagonally-extending segments, each of said segments having an arcuately-shaped transverse cross-section.

2. The panel as defined by claim 1, wherein said peaks and valleys of adjacent strips are 180 degrees out of phase with respect to each other.

3. The panel as defined by claim 2, wherein adjacent ones of said strips are slightly spaced from each other.

4. The panel as defined by claim 1 wherein:

said means defining a pair of spaced planes comprises a pair of plane faceplates;

said core is disposed between said faceplates; and said faceplates and strips are comprised of a heat-curable composite material.

5. The panel as defined by claim 4, wherein said faceplates are parallel.

6. The panel as defined by claim 4, wherein said faceplates are arcuate.

7. The panel as defined by claim 4, wherein said faceplates are not parallel.

8. A corrugated panel, comprising:

means defining a pair of spaced planes;

a core structure including a plurality of spaced, parallel, undulate strips disposed between said pair of spaced planes, said plurality of spaced parallel, undulate strips defining peaks and valleys connected by diagonally-extending segments, each of said diagonally-extending segments having a non-planar cross-section which tends to resist a force applied in a direction generally perpendicular to the strips.

9. A method of making a rigid, strong corrugated panel assembly, comprising the steps of:

providing upper and lower faceplates comprised of curable material;

providing a plurality of strips of curable material;

providing a plurality of mandrels;

arranging said mandrels in a side-by-side relation;

wrapping said strips of curable material alternately over and under adjacent ones of said mandrels so that adjacent strips are out of phase with each other;

putting indentations in said strips of curable material, said indentations being operative to increase the strength of said panel; and heating and curing said assembly whereby a rigid, strong corrugated panel assembly is made.

10. The method as defined by claim 9, including the steps of:

providing each of said strips of curable material with a plurality of alternately-arranged peaks and valleys that are interconnected by diagonal segments; and placing said peaks and valleys adjacent said upper and lower faceplates.

11. The method as defined in claim 9, wherein said indentations are made in said diagonal segments.

12. The method as defined in claim 9, wherein said step of putting indentations in said strips includes the step of providing inserts between said mandrels and said strips.

13. The method as defined by claim 9, wherein said top and bottom faceplates are comprised of the same material as said strips.

14. A method of manufacturing a corrugated panel having a core structure which includes a plurality of spaced, parallel undulate strips between a pair of spaced faceplates to define peaks and valleys connected by diagonally-extending segments, each of said diagonally-extending segments being characterized by a non-planar cross-section which tends to resist a bending force applied in a direction generally perpendicular to the strips, said method comprising the steps of:

providing a plurality of elongated mandrels;

providing a plurality of flexible strips containing a curable material;

wrapping said flexible strips over and under said elongated mandrels to define an assembly;

placing shaped inserts between said flexible strips and said elongated mandrels;

placing said assembly between said faceplates; and curing said assembly.

15. The method as defined in claim 14, including the steps of:

providing films of release material; and wrapping each of said mandrels in said release film before placing said shaped inserts and wrapping said flexible strips over and under said elongated mandrels.

16. The method as defined in claim 15, including the steps of:

providing a curing cavity;

placing said assembly in said curing cavity; and removing said mandrels from said cavity while leaving the release films.

17. The method as defined in claim 16, including the steps of:

filling the space occupied by the solid mandrels with non-curable granules before said assembly is cured; and removing said non-curable granules, release films and shaped inserts from the assembly.

18. The method as defined in claim 14, wherein said mandrels are hexagonal in cross-section.

19. The method as defined in claim 18, including the steps of:

providing films of release material;

wrapping each of said mandrels in said films of release material;

arranging the wrapped hexagonal mandrels side by side and parallel to each other so that opposing planar surfaces of the mandrels are parallel to the plane of the corrugated panel being produced; and diagonally positioning said shaped inserts between adjacent mandrels.

20. The method as defined in claim 14, including the steps of:

placing said top and bottom faceplates comprising a curable material atop and below the assembly before the assembly is cured, so that the panel is produced in a single curing operation.

21. The method as defined in claim 20, wherein said top and bottom faceplates are comprised of the same material as are said flexible strips.

* * * * *